United States Patent [19]

Perthes

[11] 4,032,232

[45] June 28, 1977

[54] MOVABLE COPY BOARD FOR REPRODUCTION APPARATUS

[75] Inventor: Horst Perthes, Neuenhain, Taunus, Germany

[73] Assignee: Kalle Aktiengesellschaft, Wiesbaden-Biebrich, Germany

[22] Filed: Oct. 11, 1973

[21] Appl. No.: 405,547

[30] Foreign Application Priority Data

Oct. 13, 1972 Germany .................... 7237610[U]

[52] U.S. Cl. ................................ 355/75; 248/298; 355/25

[51] Int. Cl.² ........................................ G03B 27/62

[58] Field of Search .......... 248/445, 448, 449, 450, 248/298; 355/75, 25, 122, 128, 129, 130, 131; 108/26, 29

[56] References Cited

UNITED STATES PATENTS

| 402,518 | 4/1889 | Fowler, Jr. ........................ 248/450 |
| 970,207 | 9/1910 | Foster .................................. 108/26 |
| 1,017,698 | 2/1912 | Stevenson .......................... 248/445 |
| 1,396,510 | 11/1921 | Fargo et al. ..................... 248/448 X |
| 2,095,815 | 10/1937 | Hopkins .......................... 355/25 X |
| 2,499,884 | 3/1950 | Singleton ...................... 248/298 X |
| 2,538,318 | 1/1951 | Mitchell ............................. 248/448 |
| 3,135,513 | 6/1964 | Simpson ........................ 248/445 X |
| 3,527,352 | 9/1970 | DeLapa ........................... 108/29 X |
| 3,659,937 | 5/1972 | Yamanoi ......................... 355/75 X |
| 3,825,338 | 7/1974 | Kolibas ............................ 355/25 X |

*Primary Examiner*—Edna M. O'Connor
*Attorney, Agent, or Firm*—Bacon & Thomas

[57] ABSTRACT

Disclosed is a movable copy board for photographic reproduction apparatus, comprising a movable document supporting frame member, a transparent plate member mounted in the frame for the accommodation of originals, an adjustable auxiliary support element being arranged for movement laterally coplanar with respect to the frame member, and means for rigidly securing the auxiliary support member in either of at least two positions to support oversize or bound materials with respect to the frame and to isolate the documents to be copied from fixed adjacent structure of the reproduction apparatus. The securing means for the auxiliary surface comprise rigid, laterally extending rod elements that move in rod guides in the frame member relative to the frame member.

3 Claims, 2 Drawing Figures

MOVABLE COPY BOARD FOR REPRODUCTION APPARATUS

BACKGROUND OF THE INVENTION

The present invention relates to a movable copy board for holding original documents to be copied in a reproduction apparatus, and more especially to a movable copy board capable of accommodating original documents of varying size and shape.

Conventional movable copy boards comprise a frame and a transparent plate mounted in the frame for the accommodation of originals. The frame together with its integral transparent plate is displaced during copying in order to produce, for example, a static image of the original on a rotating intermediate image carrier, such as an organic photoconductor. Scanning of the original usually takes place in a stripwise manner. For this purpose, there is provided in the copying device a stationary light source beneath the transparent plate and transverse to the direction of movement thereof. This light source illuminates consecutively, with movement of the copy board, each strip of the original which is then reproduced onto the photoconductor.

Copy boards of this type which have heretofore been in general use suffer from the disadvantage that only original documents in sheet form of a size not exceeding the size of the transparent plate can be copied with a reproduction device utilizing such a copy board. Books cannot be positioned firmly enough on the movable copy board, or there is the risk of damaging books or larger originals as a result of damage to the parts projecting beyond the copy board or hanging over the edge thereof.

SUMMARY OF THE INVENTION

It is therefore an object of the present invention to provide an improved design for a movable copy board for holding original documents to be copied in a reproduction apparatus.

Another object of the invention is to provide a movable copy board design which is adjustable to permit copying of large documents, books and the like without damaging the item being copied, and for enabling the item to be firmly supported independently of adjacent fixed machine structure.

In achieving the foregoing objects, there is provided in accordance with the present invention a movable copy board for reproduction apparatus, comprising a movable frame member, a transparent plate member mounted in the frame for the accommodation of originals, an auxiliary support element being arranged laterally beside the frame member and extending along one of the principal axes of the frame parallel to an outer, longitudinal side edge thereof, such that the support will be substantially coplanar with the upper surface of the frame, and means for adjusting the proximity of the support member relative to the side edge of the frame member, i.e., to a position either closer or more distant therefrom.

Most preferably, the frame and transparent plate are rectangularly shaped, and the support element is arranged alongside of one of the longer edges of the rectangular surface of the plate and is at least of equal length therewith.

The auxiliary support element is rendered laterally adjustable with respect to the frame by means of one or more laterally extending riding rods which are attached to the support element and slidably engage with guiding means in the form of apertures contained within the frame. The auxiliary support element is rigidly secured to the frame by the rods in all of its adjustable positions to provide firm, rigid support from beneath for documents being copied that have portions thereof overhanging the frame adjacent to fixed copier structure.

By means of the auxiliary support element embodied in the copy board of this invention it is possible to reproduce books and larger originals, e.g., journals and the like, with a machine using the present copy board. The corresponding original is sufficiently supported by pulling the support element out to an appropriate position and there is no risk of damaging the books or larger originals. The support element obviously moves with the frame to provide continuous support for the original document.

Other objects, features and advantages of the invention will become readily apparent from the following detailed description of a preferred exemplary embodiment, accomplished with reference to the accompanying drawings.

DETAILED DESCRIPTION OF THE INVENTION

Figure 1:
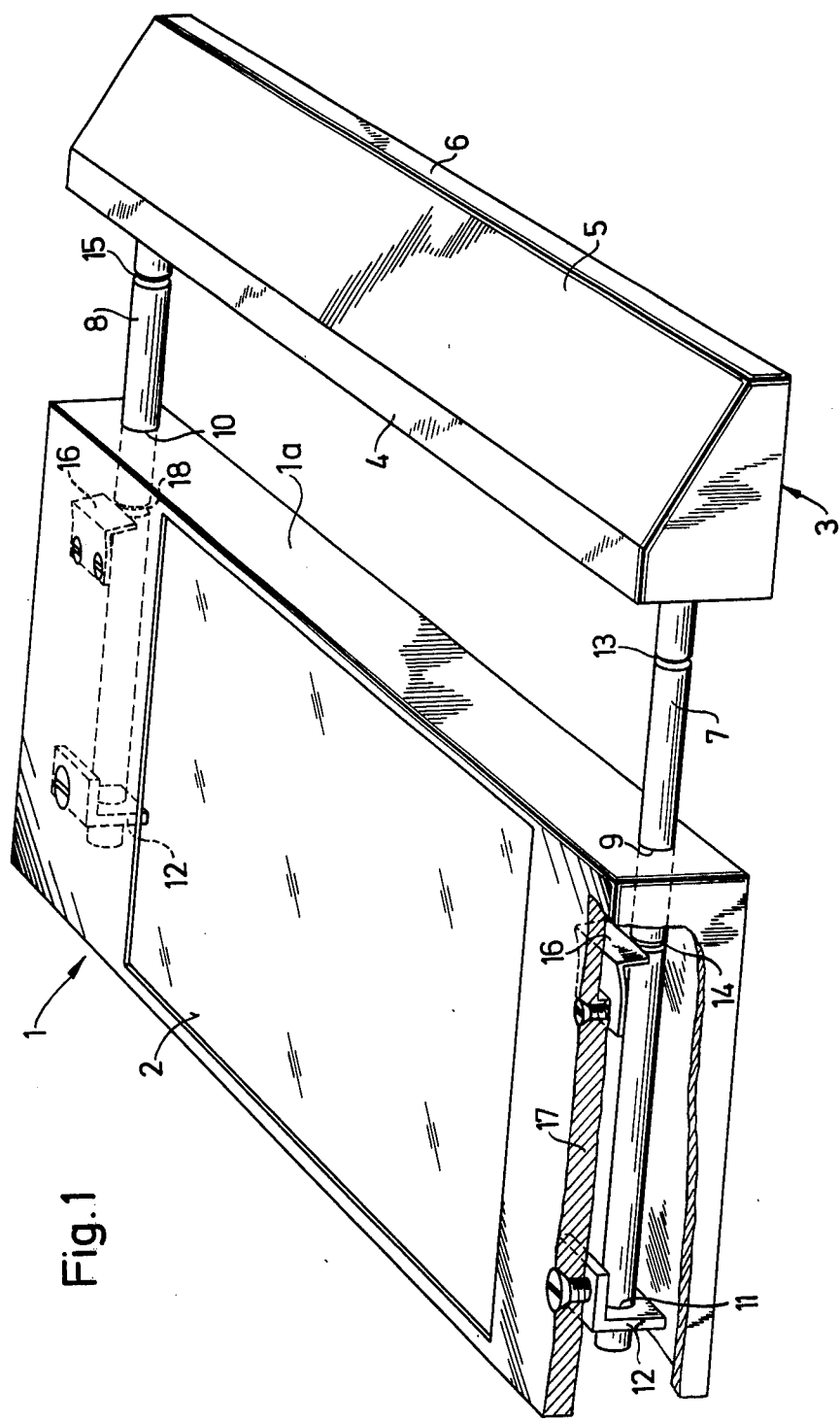
FIG. 1 is a perspective view, partly in section, illustrating a movable copy board in accordance with the present invention. All details relating to the drive and movement of the table with respect to, for example, an organic photoconductor are omitted, and certain duplicate, internal elements are shown by dashed lines.

In a copy board frame 1, there is arranged a transparent plate 2, e.g., a glass plate. When the copying device is operated, the original is placed on this glass plate 2 on the copy board. An auxiliary support element 3 is movably arranged beside an outer longitudinal side edge 1a of the frame 1. The support element 3 has a narrow, planar rectangular surface 4 in the same plane with the surface of the glass plate 2 and is of approximately the same length as the frame 1. The narrow rectangular surface 4 changes into a downwardly sloping, somewhat broader rectangular surface 5. This surface 5 finally terminates with a vertical, rectangular end surface 6. (The term longitudinal when used with respect to the frame 1 is intended to connote in the same direction as the travel or scanning direction of the frame — depending on the frame construction, it could be the shorter edge thereof if the frame is moved widthwise for scanning. The transverse direction herein is intended to mean laterally of the longitudinal direction and substantially normal with respect thereto.)

The support element 3 is firmly, and rigidly connected to two rods 7 and 8. These rods are each movably arranged in guide bores 9 and 10, respectively, of the side edge 1a of the frame 1 and each passes through another bore 11 in alignment with the first bore 9 or 10, the second bore 11 in each case being contained in an angle plate 12 firmly connected to the frame 1.

In addition, the two movable rods 7 and 8 each have two annular axially spaced grooves 13, 14 or 15, 18, respectively. The grooves 13, 14 and 15, 18 each cooperate with a pawl 16. The resilient pawls, fixed to the frame 1, are arranged to engage the grooves 13 and 15 or 14 and 18 and thereby arrest the support element 3 in a desired lateral fixed position relative to the copy board frame 1. As is apparent from the drawings, the grooves 13-18 have sloping sides. Thus, the spring pawls 16 will be able to enter corresponding grooves to hold the auxiliary support in a selected position of lateral adjustment but upon the application of an axial force to the rods 7 and 8, the pawls 16 will cam out of the grooves to permit forcible adjustment of the auxiliary support.

The angle plates 12, the pawls 16 and also the rods 7 and 8 are arranged in the hollow interior of frame 1. To illustrate the function of these elements, the frame 1 is shown broken away along the hatched surface 17.

Figure 2:
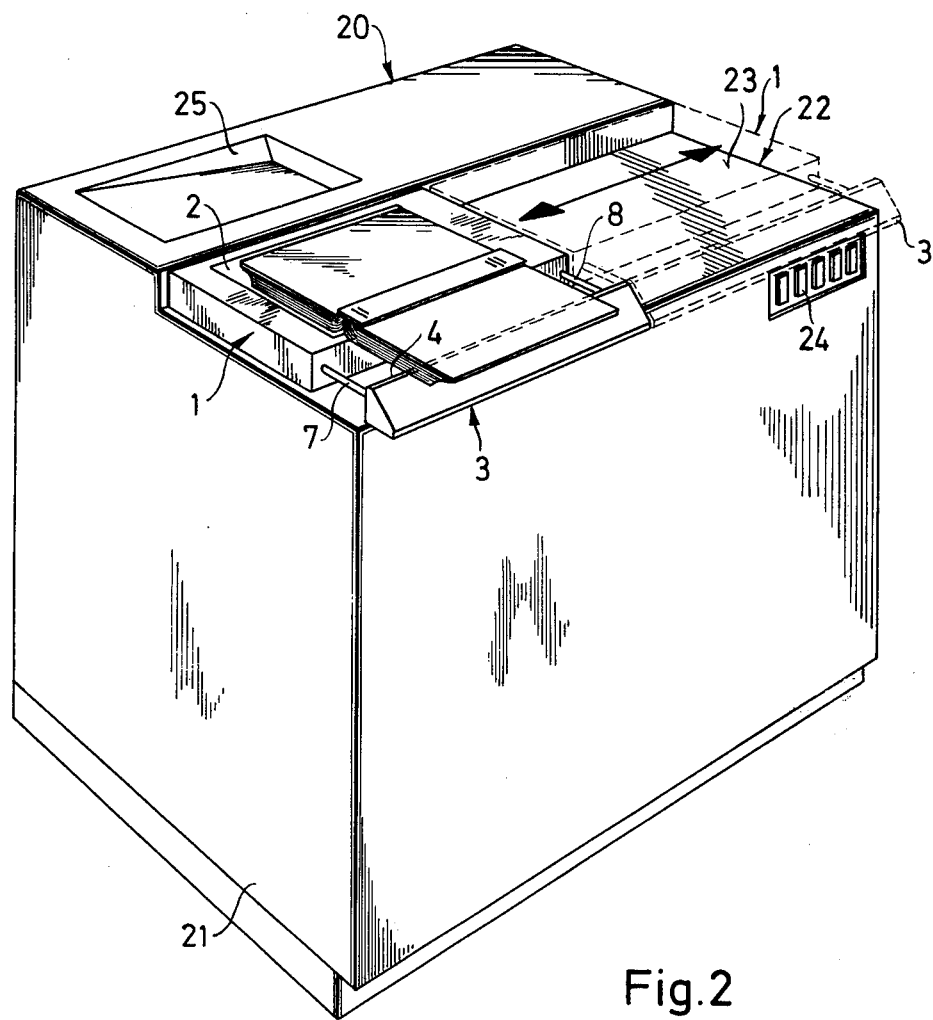
FIG. 2 is a perspective view of a reproduction apparatus embodying the improved copy board of the present invention.

In FIG. 2 there is illustrated generally by reference numeral 20 a photographic reproduction apparatus embodying the improved copy board of the present invention. The copying apparatus 20 includes a cabinet 21 having a horizontal recess 22 in its top side. Recess 22 is characterized by a flat lower surface 23 upon which the copy board comprising frame 1 and support element 3 travels back and forth during the copying operation. Also located on the front side of cabinet 21 is a control panel 24 and a receptacle 25 suitable for receiving copies of the duplicated original. The illustrated reproduction apparatus, the details of which are not part of the present invention may consist for example, of any type of apparatus wherein a movable copy board is employed for carrying the original document across a copying station. Thus, for example, the apparatus may be either an electrostatic copier, an electrophotographic copier, a photographic copying apparatus a contact printing device or the like. In the preferred embodiment of the invention, the reproduction apparatus is an electrostatic copier wherein the original is progressively exposed to a fixed light source within the machine by scanning the original, and there is then produced a temporary electrostatic image on a rotating intermediate image carrier, e.g., a drum. The temporary image is then transferred to copy sheet, which may be paper, microfiche film or the like.

With the new movable copy board of the present invention, it is thus possible to reproduce larger books and larger originals without a risk of damaging them or inadvertently causing their movement relative to the frame during exposure. The support element is drawn out to the appropriate position for such originals as shown in the drawings. The original then lies on the glass plate 2 and the support element 3 and can be reciprocated without contacting any part of the original document with any stationary parts of the copying machine.

It is apparent that many modifications, substitutions and omissions may be made in the movable copy board illustrated and described hereinabove without departing from the spirit of the invention. Therefore, it is to be understood that the scope of protection is to be ascertained solely by the appended claims.

What is claimed is:

1. In a scanning-type photographic duplicating machine having a fixed copying station including a stationary light source and a movable document supporting frame for supporting and transporting an original document to be copied across said copying station, said frame being supported on said machine for reciprocal movement adjacent fixed structure of the machine, and further including an outer, longitudinal side edge portion extending generally parallel to the scanning direction of said frame and a transparent, planar surface for supporting said document; the improvement comprising:
   a. an auxiliary, adjustable document support member carried by and movable with said frame, said auxiliary support member comprising an elongated, rigid element having an upper surface extending substantially coplanar with said transparent surface and generally parallel to the outer, longitudinal side edge portion of said frame; and
   b. means for rigidly and adjustably securing said auxiliary support member relative to said frame, said auxiliary support member securing means including means for enabling said auxiliary support member to be laterally displaced relative to said side edge portion of said frame, and rigidly secured with respect to said frame at its laterally displaced position; the upper surface of said auxiliary support member being laterally displaced in a coplanar sense with respect to said transparent surface when said auxiliary support member is laterally displaced;
   c. whereby a portion of a document to be copied extending lateraly beyond the longitudinal side edge portion of said frame can be rigidly supported from beneath with respect to said frame independently of adjacent fixed structure of the machine to protect the said document portion from damage and to prevent its inadvertent movement due to contact between said document portion and adjacent fixed structure of the machine during scanning movement of said frame.

2. The improvement in a scanning-type photograhic duplicating machine as recited in claim 1, further wherein said means for securing said auxiliary support member to said frame comprises at least a pair of rigid rod elements extending between said frame and said auxiliary support member, said rod elements extending normal to said side edge portion of said frame and being secured to and movable with said auxiliary support member relative to said frame; said frame including rod guides and pawl means for enabling lateral displacement of said rods while they are rigidly secured in a vertical sense relative to said frame, and for frictionally securing said rods in a lateral sense with respect to said frame at their laterally displaced position, said rods extending through apertures in said longitudinal side edge portion of said frame, and not intersecting the light path between said light source and said transparent surface.

3. The improvement in a scanning-type photographic duplicating machine as recited in claim 2, further wherein said frame includes an upper, planar surface adjacent said outer, longitudinal side edge portion, and said auxiliary support member forms a relatively narrow, rigid, elongated, coplanar extension of said upper planar surface of said frame when the former is located at its normal, inner position adjacent said longitudinal side edge portion of said frame, and further wherein said auxiliary support member includes a downwardly sloping edge area opposite the side thereof that is adjacent said longitudinal side edge portion of said frame.

* * * * *

UNITED STATES PATENT AND TRADEMARK OFFICE
CERTIFICATE OF CORRECTION

PATENT NO. : 4,032,232
DATED : June 28, 1977
INVENTOR(S) : HORST PERTHES

It is certified that error appears in the above-identified patent and that said Letters Patent are hereby corrected as shown below:

Page 1, change assignee's name and address from

"KALLE AKTIENGESELLSCHAFT, Wiesbaden-Biebrich" to

--HOECHST AKTIENGESELLSCHAFT--

Page 1, change the foreign application priority data from

"October 13, 1972     Germany      72 37 610 [U]" to

--October 13, 1972    Germany      72 37 610--.

In the specification, Column 4, line 36, change

"photograhic" to --photographic--.

Signed and Sealed this

Twenty-fourth Day of January 1978

[SEAL]

Attest:

RUTH C. MASON
*Attesting Officer*

LUTRELLE F. PARKER
*Acting Commissioner of Patents and Trademarks*